United States Patent Office 3,498,714
Patented Mar. 3, 1970

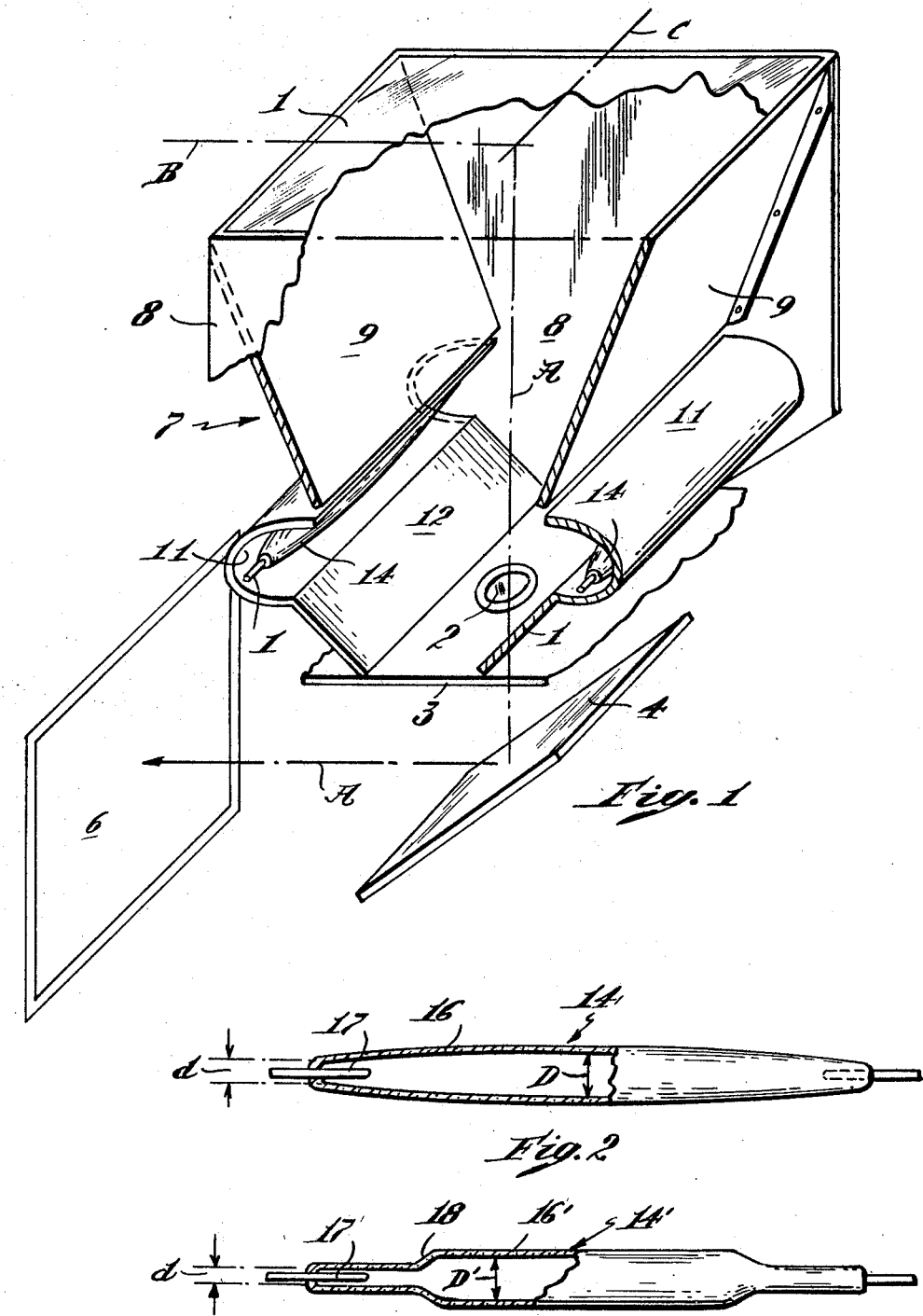

3,498,714
GAS DISCHARGE LAMP
William B. Elmer, Boston, Mass., assignor to Dennison Manufacturing Company, Framingham, Mass., a corporation of Nevada
Filed June 7, 1967, Ser. No. 644,328
Int. Cl. G03b 27/54
U.S. Cl. 355—70                4 Claims

ABSTRACT OF THE DISCLOSURE

A photographic copy apparatus employing a pair of electric lamps. Each lamp has a gas filled, elongate discharge lamp whose envelope is shaped to produce lower current density and illumination at its center than at its ends for illuminating the ends of a photocopier record window more brightly than the middle.

---

In a typical office copier documents are placed on or fed to an illuminated window, and an image of the illuminated document is projected by a lens on a plane occupied by photosensitive paper. To produce a properly illuminated print it is necessary that the image be of equal intensity throughout its area. However, light rays from the sides, and particularly the corners of the illuminated document are reduced at the image plane by attrition during passage through the lens. For uniform exposure at the image plane it is therefore necessary to illuminate the sides and corners of the record more intensely than the middle area. It is usually possible to compensate for lens attrition on one dimension of the record window, by design of reflective surfaces, between the light source and the window. But particularly where elongate light sources such as xenon flash lamps extending along one dimension of the window are used, it it is difficult to compensate for lens attrition parallel to that dimension without using masks or light absorbers which reduce the efficiency of the lighting system.

It is an object of the present invention to take advantage of the short exposure time of gas filled flash lamps such as xenon lamps, and at the same time provide a lamp which emits brighter light at its ends than at its middle, whereby a window or other optical dimension parallel to the lamp may be illuminated more intensely at its ends than at its middle.

According to the invention an electric lamp comprises an elongate envelope having a gas fill and enclosing spaced electrodes between which an arc current discharge path extends a substantial length of the envelope, the inside diameter of the envelope around said path increasing substantially toward the middle of the path, thereby to increase the cross-section of the path at its middle and substantially reduce the current density and light emission of the discharge at the middle of the path.

For the purpose of illustration a typical embodiment of the invention is shown in the accompanying drawings in which:

FIG. 1 is an isometric view, partly broken away, of photographic copying apparatus using one form of lamp according to the invention;

FIG. 2 is an elevation of the form of lamp in FIG. 1; and

FIG. 3 is an elevation of another form of lamp according to this invention.

As shown in FIG. 1 an office document copier comprises a rectangular glass platen or record window 1 for supporting a document with the record to be copied face down. A lens 2 is mounted in a wall 3 opposite the platen 1. The lens has an axis A folded by a plane mirror 4 and extending from the record window 1 to a print window or image plane 6. The lens axis A is usually normal to the two dimensions B and C of the record window and to the image plane 6.

As described more fully in my copending United States patent application Ser. No. 587,286, filed Oct. 17, 1966, and now abandoned, a light box 7 encloses the space between the platen 1 and lens 2. The light box includes specularly reflecting side walls 8 parallel to each other and the long dimension B of the platen, diffuse reflecting inclined walls 9, curved specular reflectors 11, and diffuse reflecting lower walls 12 extending from the curved reflectors 11 to the diffuse reflecting lens mounting wall 3.

The light box 7 is symmetrical on a plane through the lens axis A parallel to the short dimension C of the window 1, and the specular and diffuse reflecting walls are designed to distribute light from lamps 14 in the curved reflectors 11 more intensely at the ends of the dimension B of the window 1 than at its middle around the axis A. The lamps 14 are flashtubes mounted in the curved reflectors 11 by engagement of their end terminals 14 in a conventional single pin lamp holder (not shown). For a platen approximately 9 inches by fifteen inches each flash tube is approximately 9 inches or more long and extends parallel to the short dimension C of the record window.

As shown in FIG. 2 the flash tube has a glass or quartz envelope 16 approximately 1 mm. in thickness. At each end of the tube are electrodes 17 extending a short distance into the envelope. The envelope contains a standard fill of a gas such as xenon, argon, krypton hydrogen, xenon being preferred for the similarity to daylight of its excited spectral energy distribution. When excited by a high voltage applied to the electrodes 17, a gas arc discharge is established on a path between the inner ends of the electrodes, the gas filled discharge path being highly luminous and extending a substantial part of, if not all of the short dimension C of the window 1.

According to the present invention the light brightness of the gas discharge path is varied from end to end by increasing the inside diameter D at the middle of the envelope 16 in comparison with the inside diameter $d$ at the electrodes 17. By enlarging the middle inside dimension the cross section of the gas along the discharge path is increased. The current density is lower in the enlarged section and the thermal and light energy is correspondingly lower. Thus the light output of the tube is greater at the smaller dimension around the electrode ends and weaker at the middle. By forming the longitudinal curve of the envelope 16 on a continuous curve, symmetric on a plane through the middle of the discharge path, as shown in FIG. 2, the light output is continuously graduated.

In the copier of FIG. 1, such a graduated light output results in greater illumination at the ends of the window dimension C. This light graduation cooperates with the uneven illumination on dimension B, previously described, to illuminate the corners of the window 1 the most. Since the corners are furthest from the axis A of the lens 2, their brighter illumination compensates for the greater lens attrition of light from them.

As shown in FIG. 3, the increase in diameter from the end cross section $d$ to the middle cross section D' of another form of lamp 14' may be stepwise rather than continous if the step 18 occurs between the electrodes 17. In the lamps of FIGS. 2 and 3 a suitable inside diameter $d$ is 7 mm. and a suitable inside dimension D or D' is 11 mm.

While I have described a graduated light output lamp in connection with photographic copying apparatus, the lamp is also useful in other light projection systems such as picture projectors, in which it is desired to illuminate one portion of a plane more intensely than another. Thus it should be understood that the present disclosure is for the purpose of illustration only and that this invention includes all modifications and equivalents which fall within the scope of the appended claims.

I claim:
1. Photographic copying apparatus comprising an electric lamp comprising an elongate envelope having a gas fill and enclosing spaced electrodes between which an arc current discharge path extends a substantial length of the envelope, the light output of said arc varying lengthwise of the path with the current density of the arc, and inside diameter of the envelope around said path increasing substantially toward the middle of the path, thereby to increase the cross-section of the path at its middle to an extent substantially reducing the current density and light emission of the discharge at the middle of the path, in combination with a rectangular record window for receiving original subject matter to be copied and a lens for projecting an image of the original on a plane, said lamp being disposed such that the discharge path extends a substantial part of one dimension of the record window, whereby said window is illuminated more intensely at the ends of said window dimension than at the middle.

2. Apparatus according to claim 1 wherein said increase in diameter is on a continuous curve.

3. Apparatus according to claim 2 wherein said curve is symmetric on a plane through the middle of said path.

4. Apparatus according to claim 1 wherein said increase in diameter is stepwise.

References Cited

UNITED STATES PATENTS

| | | | |
|---|---|---|---|
| 1,792,347 | 2/1931 | Zecher | 313—220 |
| 1,826,382 | 10/1931 | Claude | 313—220 X |

FOREIGN PATENTS 235,344   5/1960   Australia.

NORTON ANSHER, Primary Examiner

R. A. WINTERCORN, Assistant Examiner

U.S. Cl. X.R.

313—182, 220